July 29, 1952 J. P. TEAS 2,605,299
PRIMARY GALVANIC CELL
Filed Feb. 23, 1950

INVENTOR
JEAN P. TEAS
BY
ATTORNEY

Patented July 29, 1952

2,605,299

UNITED STATES PATENT OFFICE 2,605,299

PRIMARY GALVANIC CELL

Jean Paul Teas, Hudson, Ohio, assignor to Union Carbide and Carbon Corporation, a corporation of New York Application February 23, 1950, Serial No. 145,721

12 Claims. (Cl. 136—107)

This invention relates to primary galvanic cells of the so-called "dry" type.

The conventional dry cell of commerce comprises a consumable metal anode usually composed of zinc, a non-consumable carbon cathode, a depolarizer mix usually containing oxides of manganese and an electrolyte, usually immobilized aqueous ammonium chloride solution. In the case of the familiar cylindrical cell the anode serves double duty as the container for the cell.

It has been long recognized that the use of a consumable metal anode as the container for a galvanic cell is something less than ideal, and from time to time suggestions have been advanced for avoiding this construction. For example it has been proposed that the container for a cell be made of carbon plates secured together to form a deep rectangular box. However the difficulties involved in adopting this construction to commercial operations, to say nothing of expense, far outweighed the looked-for advantages, and this suggestion as well as others, has come to naught.

The present invention has for its principal object a primary galvanic cell having a container which is not corroded or consumed during use of the cell.

The invention by means of which this object is achieved comprises a primary galvanic cell having a container comprising a non-corrodible tube closed at one end preferably by a metal cap and having an open end, a non-consumable carbon cathode adjacent to and in juxtaposition with said container and said closed end and an internal consumable anode electrically connected to a closure-terminal for the open end of the container. Both the cathode and the tube are permeable to gas, but the cathode is impervious to liquid, and the tube and cathode thus provide a venting path for the release of internally generated gas while effectively barring leakage of liquid from the cell.

The dry cell of this invention comprises a non-corrodible tube 10 preferably composed of fibrous material such as ordinary wrapping paper. One end of the tube 10 is closed by a metal cap 11 preferably dished outwardly and provided with a central boss 12, the latter serving as a terminal for the cell. The cap 11 is tightly secured to the tube 10, the edges of the tube and the cap being rolled or crimped together as shown for example at 13.

Adjacent to the inner surfaces of the tube 10 and the cap 11 and in juxtaposition therewith is the cathode 14 of the cell. The cathode 14 is an electrically conductive carbon composition which preferably is molded in situ, for instance by injection molding, impact-extrusion molding or other conventional molding operation, although it may be produced in any convenient manner.

Figure 2:
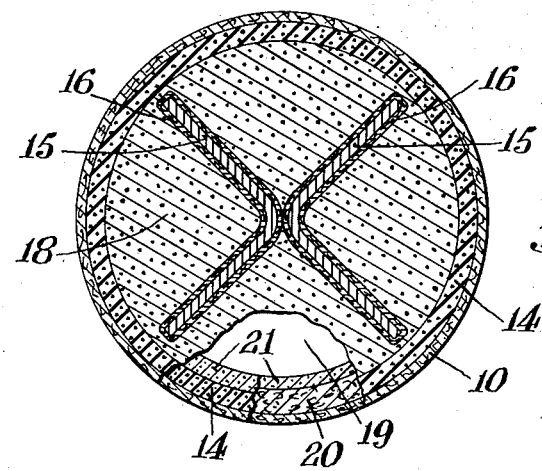
Fig. 2 is a horizontal section taken on the line 2—2 of Fig. 1 looking in the direction of the arrows.

The anode 15 of the cell, preferably composed of zinc, is placed centrally in the cell and is provided with radial vanes or fins. In cross section the anode 15 is preferably X-shaped as shown in Fig. 2. It is provided by wrapping, spraying or dipping with a conventional separator 16 of bibulous material such as paper or gel. A fibrous washer 17 may be used at one end of the cell to separate the anode 15 from the cathode 14. The vanes of the anode 15 are short enough that their edges do not come into contact with the cathode 14 at any point.

The intervening space in the cell between the anode 15 and cathode 14 is substantially filled with depolarizer mix 18 of any desired composition leaving an air space 19 through which the stem of the anode 15 extends in the direction of the open end of the tube 10. A fibrous support ring 20 is provided at the bottom of the tube 10 and the cell is sealed internally by a conventional seal 21 of wax or other sealing material. A metal bottom plate 22 to which the stem of the anode 15 is electrically connected at 23, as by soldering, serves as an external closure-terminal member for the cell. The bottom plate 22 is tightly secured to the tube 10, its edges and the edges of the tube being rolled or crimped together as shown at 24.

The tube 10 for the cell of the invention as already stated is preferably composed of a fibrous material such as wrapping paper. It is most conveniently and economically made by the well known spiral wrapping technique conventionally employed in the manufacture of such articles as mailing tubes and the like, at least two layers of paper being used. Between the layers it is preferable to employ a waterproof adhesive. The containers so made are permeable to gas. To improve liquid impermeability of the tube, the paper may be impregnated with wax or synthetic resin or the like so long as the amount of impregnant is insufficient to destroy gas-permeability.

The cathode 14 of the cell may be applied to the inner surfaces of the tube 10 in a variety of ways depending upon the characteristics of the materials used in its formulation. For example, a conductive carbon coating of the type used in making the duplex electrodes of flat-type batteries may be employed. Such coating may be applied by dipping or spraying or painting operations. However, it is preferred to form the cathode from a composition comprising finely-divided carbon and a thermo-plastic binder. A particularly efficacious composition of this type is disclosed and claimed in the copending application of F. A. Shirland, Jr., Serial Number 145,920, filed February 23, 1950, and assigned to the assignee of this application. In this composition, finely-divided graphite having a scaly or flake structure is bonded by a petroleum-base microcrystalline wax, the binder constituting about 10% to 50% by weight of the composition. A portion of the graphite, up to about 50% by weight may be replaced by a diluent such as talc or mica which is inert to dry cell electrolyte. The individual particles of graphite are large enough to be retained on a 325 mesh screen (0.043 mm. openings) but small enough to pass through a 65 mesh screen (1.65 mm. openings). When such compositions are used, the cathode is most conveniently formed by molding as indicated above. No matter how prepared the cathode must be permeable to gas but impermeable to liquid.

Figure 1:
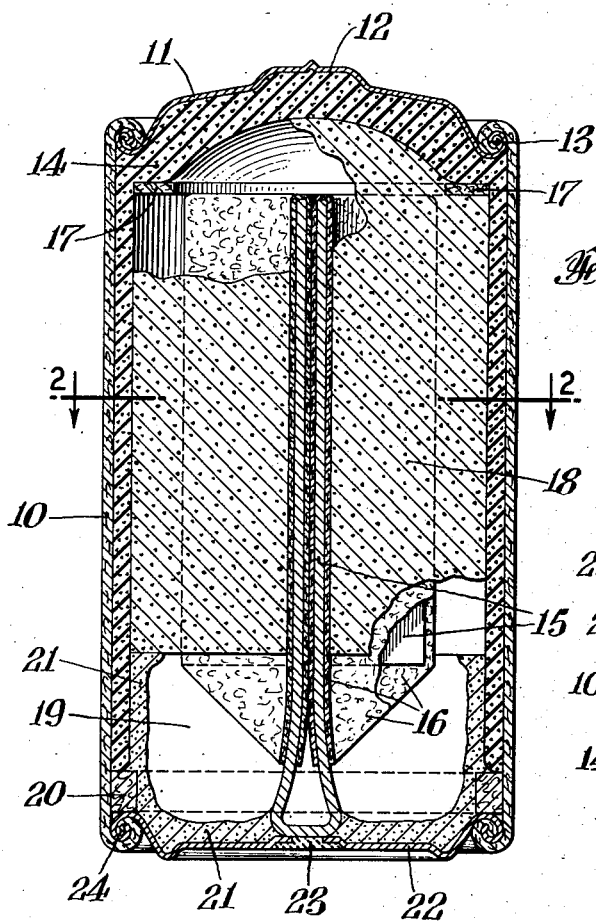
Fig. 1 is a vertical section of a primary galvanic cell according to the invention.
Figure 3:
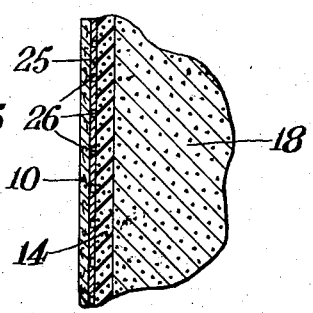
Fig. 3 is a fragmentary sectional view of a modification of the cell of the invention.

It is important that the electrical conductivity of the cathode be high. Unfortunately, the presence of a binder in the cathode composition detracts from the normally excellent conductivity of the carbon. To increase the conductivity of the cathode it may be desirable in fabricating the tube 10 of the cell of the invention to use a metal foil, for example lead, tin, or aluminum, for the inner ply 25 (Fig. 3) of the tube. In such case, to maintain gas permeability, the metallic inner ply 25 should be provided with openings, for example small perforations 26.

The simplicity of construction of the cell of the invention makes for easy assembly. The tube is made as explained above, the metal cap 11 is then sealed to it by a spinning or crimping operation and the cathode 14 formed in situ. The washer 17 is then dropped in place. At this point the depolarizer mix 18, wet with electrolyte, may be placed in the cell and the wrapped anode 15 driven into the mix 18, or if desired, the anode may be placed in position first and the mix packed around it. In either event the support ring 20 is applied, and the bottom plate 22 placed in position and connected to the stem of the anode 15. The bottom plate 22 and bottom edges of the tube 10 are spun or crimped together. Finally the seal 21 is formed in the manner described in U. S. Patent 2,244,016.

The cell of the invention possesses many advantages over cells of conventional construction perhaps the most important of which are more efficient utilization of the anode metal and the large area presented by the cathode 14. Since the anode is placed internally of the cell and no longer serves as a container, it is necessary only to supply enough metal for proper functioning of the cell from the electrical standpoint. Further, internal placement of the anode makes possible better contact between the active elements of the cell over a greater surface area.

Of equal importance, internal placement of the anode combined with the provision of a non-corrodible, gas-permeable container and a liquid-impervious lining obviates the difficulties of leakage of liquid from the cell, difficulties which have long harassed the battery manufacturer and consumer alike. In the cell of the invention a venting path is provided through the walls of the cell for the release of internally generated gas. The venting path is, however, impervious to liquid, and the continuous release of gas prevents undue increase of internal pressure which tends to cause swelling or puffing of unvented cells upon discharge.

Although the invention has been described and illustrated herein with reference to cells of circular cross-section its principles are applicable to the construction of cells of other shapes.

I claim:

1. A primary galvanic cell comprising in combination a container comprising a substantially non-corrodible, gas-permeable, tube having an open end and a closed end; a carbonaceous, gas-permeable, liquid-impervious cathode composed of scaly graphite bonded with microcrystalline wax molded adjacent to and in adherent contact with the inner surfaces of said tube and closed end; and a consumable metal anode positioned internally of said cell and electrically connected to a closure-terminal member for said open end of said tube.

2. A primary galvanic cell comprising in combination a substantially non-corrodible, gas-permeable, fibrous tube having an open end and an end closed by a metal cap, a carbonaceous gas-permeable, liquid-impervious cathode composed of scaly graphite bonded with microcrystalline wax molded adjacent to and in adherent contact with the inner surfaces of said tube and said metal cap; and a consumable metal anode positioned internally of said cell and electrically connected to a closure-terminal member for said open end of said tube.

3. A primary galvanic cell comprising in combination a substantially non-corrodible, gas-permeable, fibrous tube having an open end and an end closed by a metal cap having a boss thereon serving as a terminal for the cell; a carbonaceous, gas-permeable, liquid-impervious cathode composed of scaly graphite bonded with microcrystalline wax molded adjacent to and in adherent contact with the inner surfaces of said tube and said metal cap; and a consumable metal anode positioned internally of said cell and electrically connected to a closure-terminal member for said open end of said tube.

4. A primary galvanic cell comprising in combination a substantially non-corrodible, gas-permeable, fibrous tube having an open end and an end closed by a metal cap having a boss thereon serving as a terminal for the cell; a carbonaceous, gas-permeable, liquid-impervious cathode composed of scaly graphite bonded with petroleum-base microcrystalline wax and molded in situ adjacent to and in jutaposition with the inner surfaces of said tube and said metal cap; and a consumable metal anode positioned internally of said cell, said anode having a plurality of radial vanes and being electrically connected to a closure-terminal member for said open end of said tube.

5. In a dry cell, a container comprising a tube consisting of a plurality of layers of paper secured together and a carbonaceous cathode composed of scaly graphite bonded with petroleum-base microcrystalline wax and molded in situ adjacent to and in juxtaposition with the inner surfaces of said tube, said tube and said cathode being permeable to gas, and said cathode being substantially impermeable to liquid, said tube being sealed at both ends against escape of liquid and gas by rigid, impervious closure-members provided with electrical terminals for said cell, said tube and cathode being gas-permeable to provide a venting path for release of gas from the cell while preventing escape of liquid therefrom.

6. In a dry cell, the combination of a laminated tube, the innermost lamination of said tube being metal foil provided with passages therein and the remainder of the laminations being paper; and a carbonaceous cathode composed of scaly graphite bonded with petroleum-base microcrystalline wax and molded in situ adjacent to and in juxtaposition with said innermost lamination, said tube and said cathode being gas-premeable to provide a venting path for release of gas from the cell while preventing escape of liquid therefrom.

7. In a dry cell, a container comprising a paper tube, a rigid cover having an electrical terminal thereon for one end of said tube, and a lining for said tube composed of scaly graphite and microcrystalline wax molded in situ in said tube and in intimate, adherent contact with said tube and cover, said lining being impervious to liquid but gas-permeable and serving as the cathode of said cell.

8. In a dry cell, a gas-permeable paper tube; a metal closure for one end of said tube; a carbonaceous, gas-permeable, liquid-impervious cathode molded in situ from scaly graphite and petroleum base microcrystalline wax and lining said tube and making electrical connection with said closure; electrolyte-wet depolarizer mix substantially filling said tube except for a free space at the other end thereof and in contact with said cathode; a consumable metal anode embedded in said mix; and a metal closure for the other end of said tube making electrical contact with said anode and insulated from said cathode.

9. In a dry cell, a container-cathode comprising a paper tube, a rigid cover having an electrical terminal thereon for one end of said tube, said cover and said tube being joined in liquid-tight manner; an electrically conductive, liquid-impermeable, gas-permeable carbonaceous lining composed of scaly graphite and microcrystalline wax molded in situ in contact with said tube and said cover and making electrical contact with said terminal; an electrolyte-wet depolarizer mix substantially filling said container-cathode except for a free space at the other end thereof; a unitary consumable metal electrode having active surfaces embedded in said depolarizer mix and a connecting shank extending through said free space; and an electrically conductive cover joined in liquid-tight manner to said other end of said tube and electrically connected to said shank.

10. The method of making a primary galvanic cell which comprises forming an open ended tube of fibrous material; applying an end closure cap comprising an electrical terminal exposed on the inner and outer surfaces thereof to one end of said tube; forming within said tube an electrically conductive carbonaceous lining in intimate, adherent contact with the inner wall of said tube and in electrically conductive contact with the terminal portion of said end closure cap; inserting in said tube electrolyte-wet depolarizer mix and a substantially centrally-located anode, said mix making electrical contact with said lining and anode; and applying an end closure cap comprising an electrical terminal exposed on the inner and outer surfaces thereof to the other end of said tube to close the same and to make electrical contact with said anode.

11. The method of making a primary galvanic cell which comprises forming an open ended tube of fibrous material; applying an end closure cap comprising an electrical terminal exposed on the inner and outer surfaces thereof to one end of said tube; molding within said tube and in contact with the inner wall of said tube and end closure cap an electrically conductive lining composed of scaly graphite and microcrystalline wax; inserting in said tube electrolyte-wet depolarizer mix and a substantially centrally located, vaned, consumable metal anode, said mix making electrical contact with said lining and anode; and applying an end closure cap comprising an electrical terminal exposed on the inner and outer surfaces thereof to the other end of said tube to close the same and to make electrical contact with said anode.

12. The method of making a primary galvanic cell which comprises forming an open ended tube of paper; applying a metal end closure cap to one end of said tube; molding within said tube and in contact with the inner wall of said tube and end closure cap an electrically conductive lining composed of scaly graphite and microcrystalline wax; inserting in said tube electrolyte-wet depolarizer mix and a substantially centrally located, vaned, zinc anode, said mix making electrical contact with said lining and anode; and applying a metal end closure cap to the other end of said tube to close the same and to make electrical contact with said anode.

JEAN PAUL TEAS.

REFERENCES CITED

The following references are of record in the file of this patent:

UNITED STATES PATENTS

| Number | Name | Date |
|---|---|---|
| 1,184,135 | Rudolphs | May 23, 1916 |
| 1,266,166 | Sangers | May 14, 1918 |
| 1,267,349 | Smith | May 21, 1918 |
| 1,836,903 | Chaney | Dec. 15, 1931 |
| 2,180,839 | Schumacher et al. | Nov. 21, 1939 |
| 2,392,795 | Anthony et al. | Jan. 8, 1946 |